US006880412B1

(12) United States Patent
Gupta

(10) Patent No.: US 6,880,412 B1
(45) Date of Patent: Apr. 19, 2005

(54) DEVICE AND METHOD FOR TESTING THE TENSION IN STRESSED CABLES OF CONCRETE STRUCTURE

(76) Inventor: Pawan R. Gupta, #1405, 75 Eastdale Ave., Toronto, Ontario (CA), M4C 5N3

( * ) Notice: Subject to any disclaimer, the term of this patent is extended or adjusted under 35 U.S.C. 154(b) by 0 days.

(21) Appl. No.: 09/521,037

(22) Filed: Mar. 8, 2000

(30) Foreign Application Priority Data

Mar. 11, 1999 (CA) .............................................. 2265193

(51) Int. Cl.$^7$ .............................................. G01L 5/04
(52) U.S. Cl. ................................ 73/862.391; 73/862.42
(58) Field of Search ..................... 73/862.391, 862.451, 73/862.42, 862.381, 158, 862.454, 144, 862

(56) References Cited

U.S. PATENT DOCUMENTS

| | | | | | |
|---|---|---|---|---|---|
| 3,174,334 | A | * | 3/1965 | McKernan .............. | 73/862.471 |
| 3,176,510 | A | * | 4/1965 | Kimmell et al. .............. | 73/144 |
| 3,203,235 | A | * | 8/1965 | Stein ....................... | 73/862.46 |
| 3,618,379 | A | * | 11/1971 | Lipton ................... | 73/862.471 |
| 3,653,258 | A | * | 4/1972 | King ...................... | 73/862.454 |
| 3,839,908 | A | * | 10/1974 | Casper ........................ | 73/144 |
| 4,077,256 | A | * | 3/1978 | Hollander ................... | 73/145 |
| 4,135,393 | A | * | 1/1979 | Jordan ........................ | 73/144 |
| 4,423,639 | A | * | 1/1984 | Grade et al. ............. | 73/862.42 |
| 4,534,228 | A | * | 8/1985 | Burbank, Jr. ............. | 73/862.45 |
| 4,746,024 | A | * | 5/1988 | Hensler ....................... | 212/158 |
| 4,907,458 | A | * | 3/1990 | Biggs et al. .................. | 73/827 |
| 4,989,450 | A | * | 2/1991 | Shoberg et al. ................ | 73/158 |
| 5,251,492 | A | * | 10/1993 | Nowag .................. | 73/862.472 |

FOREIGN PATENT DOCUMENTS

JP        08178770 A  *  7/1996  ............. G01L/5/06

OTHER PUBLICATIONS (1997) Wire Tension Meter SM 55C1/SM 150C1.*
Proceq SA (1994) Zurich, Switzwerland. SM55 SM150 Wire tension meter.*
Proceq SA (1994) Zurich, Switzwerland. SM55 SM150 Wire tension meter.*
Proceq SA (1994) Zurich, Switzerland. SM55 SM 150 Wire tension meter.*
Proceq SA (1994) Zurich, Switzerland. SM55 SM 150 Wire tension meter.*
Scott A. Civjan, P. E. et al., Instrument to Evaluate Remaining Prestress in Damaged Prestressed Concrete Bridge Girders, PCI Journal Mar.–Apr. 1998, pp. 62–71.
Proceq SA, Zurich, Switzerland, SM55 SM150 Wire Tension Meter (4 sheets).

* cited by examiner

Primary Examiner—Edward Lefkowitz
Assistant Examiner—Lilybett Martir
(74) Attorney, Agent, or Firm—Randall J. Knuth

(57) ABSTRACT

A device and method for testing the tension in a stressed cable of a concrete structure. The device includes a frame and a hydraulic jack mounted onto the frame. The hydraulic jack applies a force to the stressed cable and displaces the stressed cable laterally. A hook or clamp is connected to the hydraulic jack for grasping the stressed cable in order to apply the force thereto, and a dial gauge is mounted onto the frame for measuring the deflection of the stressed cable once the force has been applied. The amount of pre-stress within the stressed cable can be calculated by measuring the amount of deflection caused to the stressed cable by the force of the jack.

3 Claims, 2 Drawing Sheets

FIG. 2
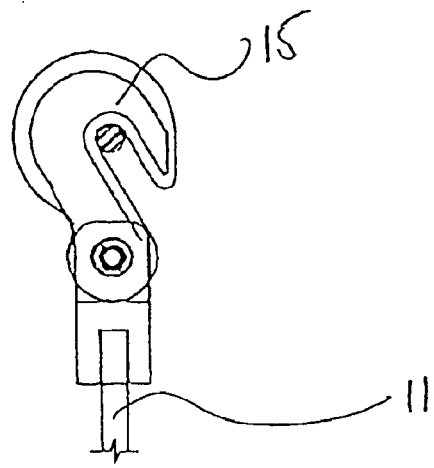
FIG. 3
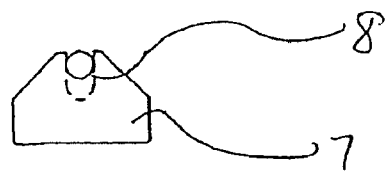
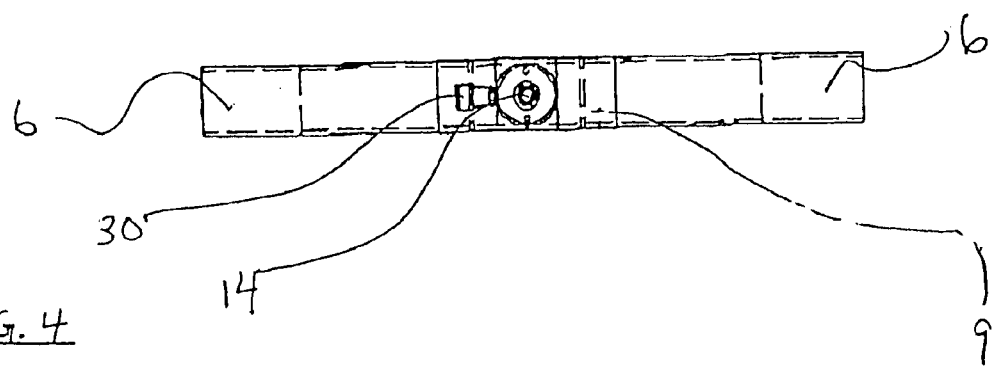
FIG. 4

DEVICE AND METHOD FOR TESTING THE TENSION IN STRESSED CABLES OF CONCRETE STRUCTURE

BACKGROUND OF THE INVENTION

1. Field of the Invention

The present invention relates to a device and method for testing the tension in stressed cables of concrete structures, particularly the pre-stressing forces in unbonded tendons in post-tensioned concrete structures.

2. Description of the Related Art

Concrete, while capable of carrying a compressive vertical load, does not carry tensile forces well. To help alleviate this problem, during the last twenty years concrete builders have begun to use unbonded tendons in post-tensioned structures. The unbonded tendons consist of steel cables made up of thin wires wrapped around each other and placed in grease-filled sheathing. The unbonded tendons are anchored at their ends and attached to the concrete solely at these end anchors. Over time such stressed cables have been known to deteriorate, corrode and/or break, thereby resulting in unsafe conditions within the structures, the result being the replacement of the existing post-tensioning system or the abandonment of post-tensioning. For the use of cumbersome external reinforcing. This can lead to a major expense which may often either be deferred or avoided if the actual level of pre-stress in the system is known and monitored over time.

Current testing of concrete includes a visual survey of exposed stressed cables and a penetration test to detect whether these stressed cables are still stressed. This latter test consists of attempting to wedge the flat head of a screwdriver between the individual wires that make up a stressed cable. If penetration is achieved, a stressed cable likely has broken wires or is not fully stressed. Penetration cannot be achieved with a fully stressed cable or when ice or corrosion products wedge a broken strand into place. Accordingly, while these tests are usually informative, they are preliminary in nature, they do not give any indication of the exact level of pre-stress within the stressed cable, and they may actually be misleading.

Several attempts have been made to measure the amount of strength in a structural member. For example, U.S. Pat. No. 5,067,353 to Sersen describes a device for determining the strength of a roof member by determining the amount of deflection of the roof member when a force is applied thereto. The device uses a load base mechanism to apply a force to the roof member and a gauge to measure the resulting deflection when that force is applied.

U.S. Pat. No. 4,501,13 to Mehes et al. describes a test machine for determining the strength of concrete comprising a frame, a breaking cup which is embedded in the concrete before it cures, an extractor head attached to the breaking cup for extraction of the breaking cup once the concrete has solidified, and a force measuring means which applies a tensile force to extract a sample from the cured concrete structure. The device is concerned with testing the strength of the concrete in the concrete structure, and not with measuring the strength of the reinforcement contained therein.

U.S. Pat. No. 3,832,899 to Nicolau describes a dynamometrical deflection measuring method and apparatus. The system uses a compression dynamometer and two articulated bars for measuring the tension in a cable or a chain. The device does not directly measure the deflection in the cable. It is used as a sensor as opposed to a loading device. The device operates by measuring the compression in the articulated bars and assumes that because of geometry, the tension in the cable will be equal. The device assumes that the journalled bars will always remain parallel to the cable in tension, which is not always the case. Furthermore, discrepancy in the geometry will reduce the accuracy of the device. The system is useful in a drillometer on the dead end of an operating cable, or as a torsiometer mounted on the chain of an intermediate transmission.

A review of the prior art therefore suggests that there remains a need for an accurate and inexpensive means to assess the amount of pr e-stress in a stressed cable and particularly a stressed cable of a concrete structure.

SUMMARY OF THE INVENTION

It is an object of the present invention to develop a device and method for testing the force in stressed cables of a concrete structure that is an improvement over the prior art.

According to one aspect of the present invention there is provided a device for measuring the tension in stressed cables, the device comprising a frame having a pair of ends adapted to engage a the stressed cable; a jack mounted on the frame between its ends for applying a force on the stressed cable; and a measuring means on the frame, for measuring the deflection of the stressed cable.

According to another aspect of the present invention, there is provided a method of detecting the amount of tension in a stressed cable, the method including the following steps, supporting the stressed cable at a selected pair of spaced apart points; applying a force to the stressed cable sufficient to deflect the cable relative to the supported points; and measuring the deflection of the stressed cable.

The device and method of the present invention have many advantages. The present invention does not require the de-stressing of the stressed cable in order to test it. The present invention can be applied along any length of the stressed cable by exposing only a small portion of the stressed cable; and it is quick and efficient to use and involves a relatively simple device that is inexpensive to operate.

Other advantages, objects and features of the present invention will be readily apparent to those skilled in the art from a review of the following detailed descriptions of the preferred embodiments in conjunction with the accompanying drawings and claims.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 2 is a side view of the hook of the device;

FIG. 3 is a side view of the end of the frame arm;

FIG. 4 is a cross-sectional view of the frame as viewed from the top; and

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
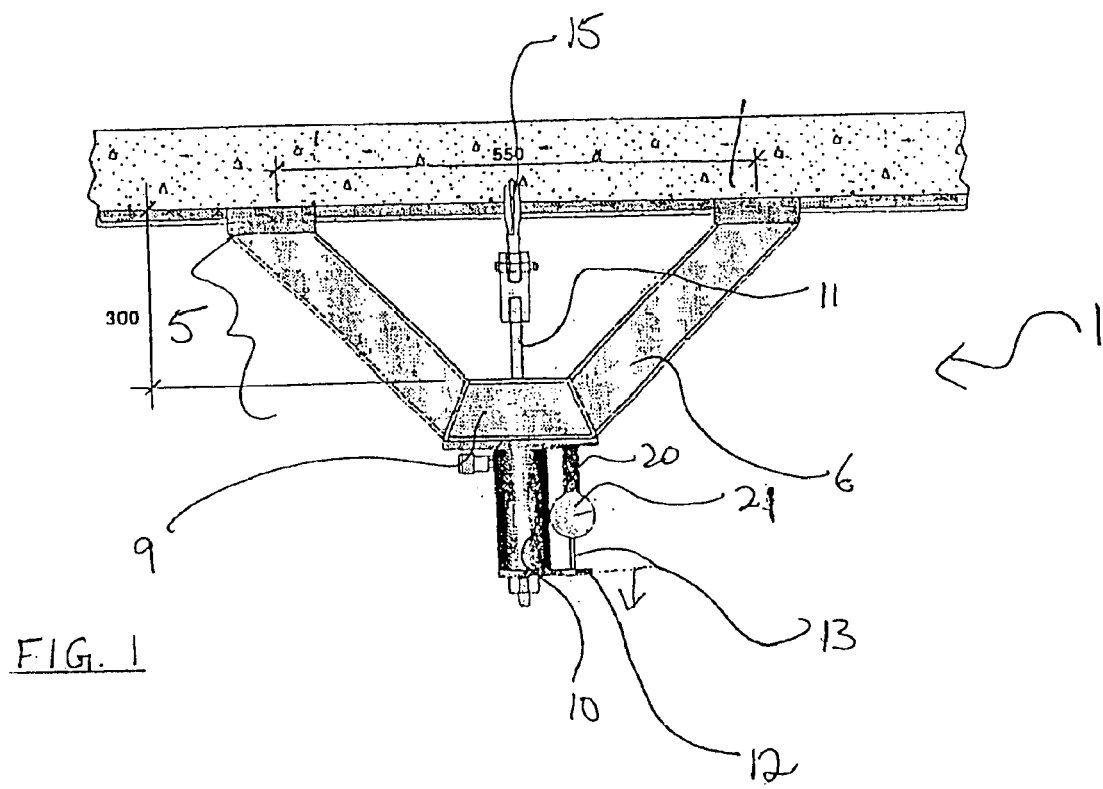
FIG. 1 is a front view of the device.

Referring to FIG. 1, the device 1 for testing the force in a stressed cable contained within a concrete structure includes a frame 5, jack 10, hook 15, and gauge 20.

In a preferred embodiment, the frame 5 is V-shaped with two angled arms 6 attached to a base 9. The arms 6 of the frame 5 extend away from the base 9 and towards the structure. The ends 7 of the arms 6 are angled upward and include a notch 8 configured for attachment to the stressed cable (see FIG. 3). The shape and configuration of the frame 5 are conducive to fitting against a concrete structure while the amount of pre-stress in the stressed cable is measured. In a preferred embodiment, the frame 5 may be made of steel and is an HSS molding or hollowed block shape. However, it will be obvious to one skilled in the art that any number of configurations and materials would be suitable for the frame without deviating from the functioning of the invention as claimed.

Jack 10 is mounted to the base 9 of the frame 5 with screws. A piston 11 of the jack 10 extends through a hole 14 in the base 9 of the frame 5 (see FIG. 4) and is attached to the hook 15 by nut and bolt attachment. In a preferred embodiment, the jack 10 is a single acting hydraulic jack which can apply a known lateral force to the stressed cable. Jack 10 is accommodated with an activation means 30 which initiates the operation of a set force. It will be obvious to one skilled in the art that the activation means can take any number of forms including switch or other manual method of application of force, including a screw jack.

Hook 15 is attached to the end of the piston 11 and is configured to fit around the stressed cable (FIG. 3). When force is applied by the jack 10, this force is transferred to a pulling action which deflects the stressed cable away from the structure.

The frame 5 is hung on the stressed cable by the hook 15. The hook 15 engages the stressed cable whilst the arms 6 of the frame 5 engage the stressed cable at notch 8. The gauge length (L) is determined by the distance between the arms 6 of the frame 5 (see FIG. 5).

The deflection of the stressed cable is measured by gauge 20 which is mounted on the frame 5. Gauge 20 includes a leg 13 which abuts a plate 12. The plate 12 is secured to the base of the piston 11 (FIG. 1) by nut and bolt attachment. When force is applied by the jack 10, the piston 11 and attached plate 12 move downward, away from the base 9 of the frame 5 by a distance equal to the deflection of the stressed cable. The dial indicator 21 then indicates the amount of deflection within the stressed cable which is equal to the displacement of the piston 11 and attached plate 12. It will be apparent to one skilled in the art that any other suitable system that can measure deflection under a known load could be used without deviating from the teachings of the present invention.

The frame 5 can be calibrated by measuring the transverse deflection of a stressed cable where the amount of tension within the stressed cable is already known. The frame 5 can also be calibrated under field conditions by measuring the transverse deflection of multiple stressed cables of one structure. The stressed cables are cut after testing to release the pre-stress within the stressed cable and the resulting elastic shortening of the stressed cable is measured and used to determine the actual tension within the stressed cable.

In operation, the method of using the device 1 consists firstly in creating a test segment of the stressed cable by exposing a short length of a stressed cable. The device 1 is then attached to the test segment by clamping the hook 15 to a portion of the exposed stressed cable and attaching the ends 6 of the frame 5 to the stressed cable through insertion of the stressed cable into notch 8. The jack 10 is activated by activation means 30, thereby applying a base force to the device, in order to secure the device to the structure without the need of manual support. The gauge 20 is read in order to get a base reading for the device. The jack 10 is then reactivated and a known pulling force is applied to the stressed cable by the jack 10. The jack 10 is programmed to pull with a particular force by using a servo valve that is set to a pre-determined pressure. In addition, a pressure gauge would be used to measure the pressure in the hydraulic line connected to the jack 10 and consequently with the proper calibration factors, the lateral force applied to the cable. The stressed cable is deflected away from the structure and the amount of deflection "Δ" is measured through the displacement of the piston 11 as measured by the indicator 21 of the gauge 20. The angle of deflection "θ" and tension "T" within the stressed cable are calculated using the following equations where "L" represents the gauge length which is the distance between the ends 7 of the arms 6, "Δ" represents the deflection of the stressed cable and "F" is the known applied force.

$$T = \frac{F}{2\sin\theta} \text{ where } \theta = \tan^{-1}\frac{\Delta}{L/2}$$

Figure 5:
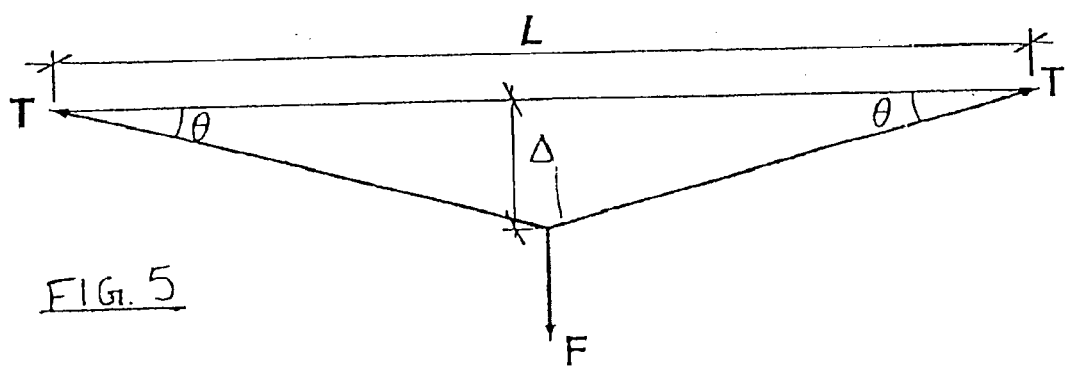
FIG. 5 is a free body diagram of the stressed cable under the transverse load.

FIG. 5 shows a free body diagram of the stressed cable under the transverse load. The deflection has been exaggerated substantially to make it visible. "L" represents the gauge length, "F" the applied force and "θ" the angle of deflection. Knowing the magnitude of the transverse force "F" and the resulting deflection of the stressed cable, the tensile force in the stressed cable can be accurately calculated.

Table 1 shows the expected deflections for different levels of stressed cable forces when transverse forces of 6 kN (500 psi) and 12 kN (1000 psi) are applied. To eliminate errors due to the initial curvature in the pre-stressing stressed cables and variability due to initial slack in the system, the measurements are taken at two deflection levels. The incremental deflection is then used to more accurately calculate the tension in the stressed cable.

TABLE 1

| | Theoretical Predictions of Deflections Gauge Length (L) = 457 mm | | | | |
|---|---|---|---|---|---|
| F (kN) T (kN) | 6.0 (kN) $\theta_1$ (deg) | 12.0 (kN) $\theta_2$ (deg) | 6.0 (kN) $\Delta_1$ (mm) | 12.0 (kN) $\Delta_2$ (mm) | $\Delta_2 - \Delta_1$ (mm) |
| 25 | 6.89 | 13.89 | 27.62 | 56.49 | 28.87 |
| 50 | 3.44 | 6.76 | 13.73 | 27.09 | 13.35 |
| 75 | 2.29 | 4.50 | 9.15 | 17.99 | 8.84 |
| 100 | 1.72 | 3.37 | 6.86 | 13.47 | 6.61 |
| 125 | 1.38 | 2.70 | 5.49 | 10.77 | 5.29 |
| 150 | 1.15 | 2.25 | 4.57 | 8.97 | 4.40 |
| 175 | 0.98 | 1.93 | 3.92 | 7.69 | 3.77 |
| 200 | 0.86 | 1.69 | 3.43 | 6.73 | 3.30 |

It will be obvious to one skilled in the art that for the purposes of stressed cables, the cables consist of thin wires that are wrapped around one another thereby reducing the inherent stiffness of the cable. However, if this device were to be used in association with a reinforcing rod, the inherent stiffness of the rod would have to be considered and factored into the deflection measurements.

It will be understood that while the invention has been described with reference to the testing of stressed cables in concrete structures, the invention may be used for many other purposes. For instance, without departing from the overall structure of the device, it would be clear to anyone skilled in the art that the device could be used to measure the tension in guide tower cables, or suspension cables in a bridge.

Numerous modifications, variations and adaptations may be made to the particular embodiments of the invention described above without departing from the scope of the invention, which is defined in the claims. As but one example, the present invention could incorporate a custom built electronic load cell to accurately measure the lateral force and an electronic displacement measurement device with corresponding date acquisition system to increase the accuracy. Moreover, it will be obvious to one skilled in the art, that the device could be modified to accommodate a pushing rather than a pulling force on the stressed cable.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A device for measuring the tension in a stressed cable, said device comprising:
    a frame having a pair of notched ends adapted to receive and support the stressed cable, each said notched end facing away from said frame;
    a hydraulic jack mounted on said frame between its ends, said jack being configured for applying a preset pulling force on the stressed cable by means of a hook on the end of said jack; and
    a linear deflection measuring means on said frame, for measuring the linear deflection of the stressed cable.

2. A device as defined in claim 1 wherein said measuring means includes a gauge mounted onto said frame.

3. A device as defined in claim 1 wherein the frame is in the shape of a "V".

* * * * *